US009775003B2

(12) United States Patent
Ciecko

(10) Patent No.: US 9,775,003 B2
(45) Date of Patent: Sep. 26, 2017

(54) LOCATION AND ACTIVITY AWARE MEDIA CONTENT DELIVERY SYSTEM

(71) Applicant: Brendan Ciecko, Boston, MA (US)

(72) Inventor: Brendan Ciecko, Boston, MA (US)

(73) Assignee: CUSEUM, Inc., Boston, MA (US)

( * ) Notice: Subject to any disclaimer, the term of this patent is extended or adjusted under 35 U.S.C. 154(b) by 0 days.

(21) Appl. No.: 15/172,294

(22) Filed: Jun. 3, 2016

(65) Prior Publication Data

US 2017/0150321 A1 May 25, 2017

Related U.S. Application Data

(60) Provisional application No. 62/172,528, filed on Jun. 8, 2015.

(51) Int. Cl.
*H04W 4/02* (2009.01)
*H04W 4/18* (2009.01)

(52) U.S. Cl.
CPC .......... *H04W 4/028* (2013.01); *H04W 4/021* (2013.01); *H04W 4/026* (2013.01); *H04W 4/18* (2013.01)

(58) Field of Classification Search
CPC ..... H04W 4/028; H04W 4/021; H04W 4/026; H04W 4/18
See application file for complete search history.

(56) References Cited

U.S. PATENT DOCUMENTS

| 2014/0122040 | A1* | 5/2014 | Marti | G06F 17/5009 703/6 |
| 2016/0005053 | A1* | 1/2016 | Klima | G06Q 30/0201 705/7.29 |
| 2016/0363450 | A1* | 12/2016 | Sahay | G01C 21/20 |
| 2016/0366560 | A1* | 12/2016 | Logan | H04W 4/028 |

* cited by examiner

*Primary Examiner* — Kashif Siddiqui
(74) *Attorney, Agent, or Firm* — Robert Schuler

(57) ABSTRACT

A media content delivery system includes a network server in communications with a plurality of mobile communication devices. The network server maintains a map of geo-fence instances and corresponding geographic locations of each, and it maintains a store of media content that relates to each geographic location. Each of the communication devices has functionality that operates to determine its current geographic location and to send the current geographic location to the network server. The network server runs a logical process that determines if a current location of the mobile device corresponds to a geo-fence location, and if so, operates to determine whether the user is waiting in a queue defined by the geo-fence. If both of these conditions are satisfied, the server selects and delivers media content to the mobile device that relates in some manner to a venue associated with the identified geo-fence instance.

19 Claims, 8 Drawing Sheets

FIG. 3B

Figure 1A:
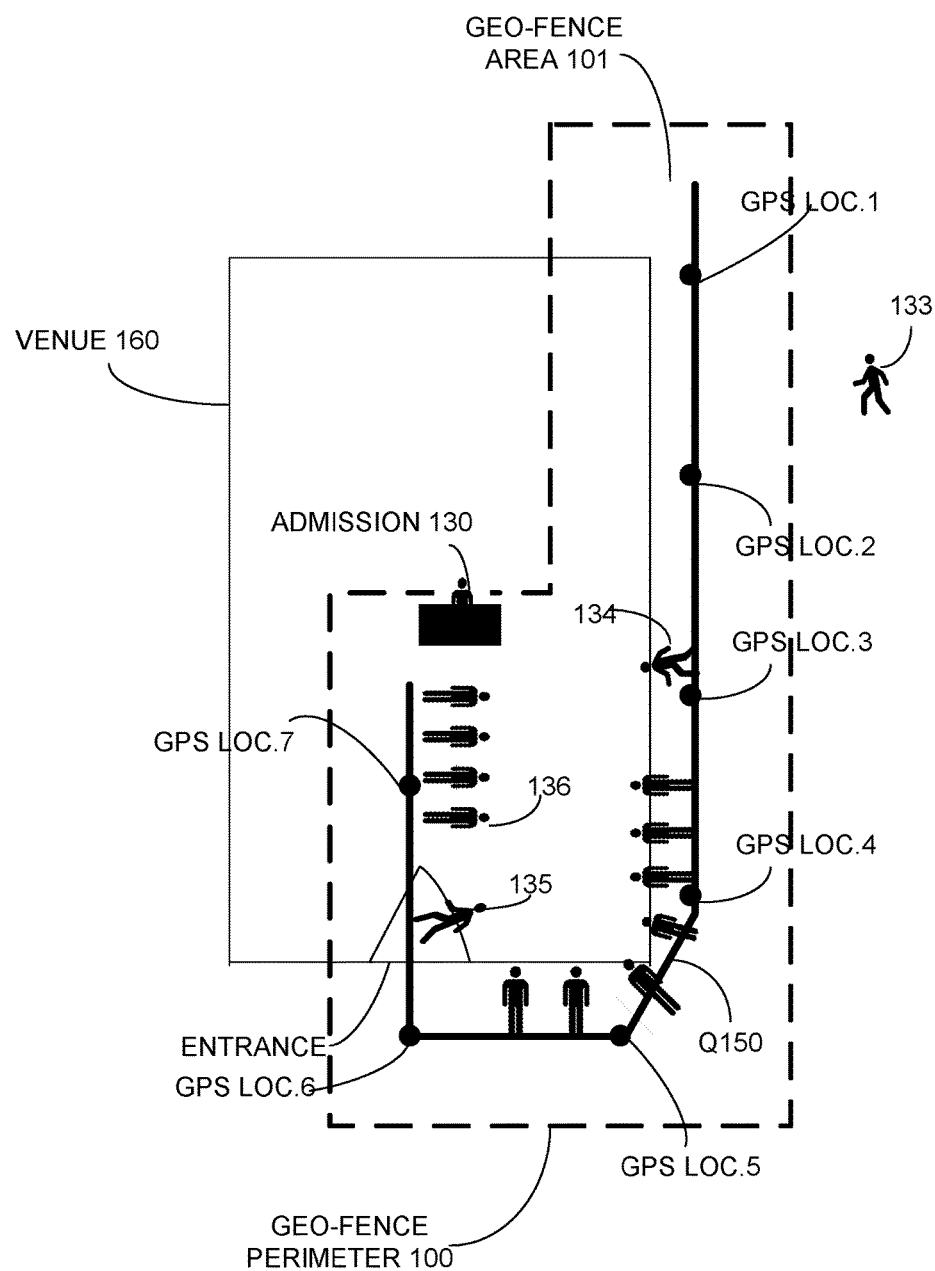

STP=STOPPED  
SM=SLOW MOVEMENT  
RM=RAPID MOVEMENT

DETECTION TIME  
PERIODS=3 SEC  
INTERVALS

CURRENT/RECENT MOVEMENT INFORMATION 223

|  | CURRENT PERIOD | PREVIOUS PERIOD(S) |
|---|---|---|
| USER.1 | STP-3 SEC | SM-3 SEC/STP-6 SEC • • • |
| USER.2 | SM-3 SEC | STP-3 SEC/STP-3 SEC • • • |
| USER.3 | SM-3 SEC | RM-3 SEC/RM-3 SEC |
| • | | |
| • | | |
| • | | |
| USER.N | RM-3 SEC | NO RECORD |

FIG. 3C

LOCATION INFO. – GEO-FENCE ID MAP 211

BEACON 10  
BEACON 20  
BEACON 30  — GEO-FENCE 102  
BEACON 40  
BEACON 50

GPS LOC.1  
GPS LOC.2  
GPS LOC.3  
GPS LOC.4  — GEO-FENCE 100  
GPS LOC.5  
GPS LOC.6  
GPS LOC.7

IMAGE@LOC.A  
IMAGE@LOC.B  
•  
•  — GEO-FENCE 103  
•  
IMAGE@LOC.Z

US 9,775,003 B2

LOCATION AND ACTIVITY AWARE MEDIA CONTENT DELIVERY SYSTEM

1. FIELD OF THE INVENTION

The present disclosure relates generally to the delivery of media content based upon a geographic location of a mobile communication device and device user activity, and particularly to the delivery of content to a friendly user based upon the geographic location and activity of the mobile device user.

2. BACKGROUND

With the proliferation of wireless connectivity to networks that permit access to information stored in association with computational devices (i.e., servers) connected to these networks, a very large number of applications (mobile applications) are being developed that are compatible to run on mobile communication devices. During the time that a mobile device is connected to a wireless network, a user of the device is able to search for and down-load information that they are interested in and which is germane to their current geographic location. At some point, network developers and mobile communication developers realized that by implementing geographic positioning system (GPS) functionality in a mobile communication device, they could easily track the current location of a mobile device, and use this current location as the basis for identifying information to be delivered to the mobile device. Such location based or location aware information delivery applications can be configured to request or pull location dependent content from a network, or they can be configured to automatically accept a certain type of information that is of interest to the device user. Regardless of the method, the delivery of information to a mobile device based upon the current location of that device was a step forward in the development of mobile applications.

In addition to including location tracking functionality in mobile communication devices, wireless communication device developers found it beneficial to implement functionality in these mobile devices that detects device motion and orientation. This functionality is typically implemented with an accelerometer, and the output of an accelerometer can be used to re-orient information that is displayed on a mobile device screen so that the user is not forced to re-orient the device in order to easily view the information.

3. BRIEF DESCRIPTION OF THE DRAWINGS

Figure 1B:
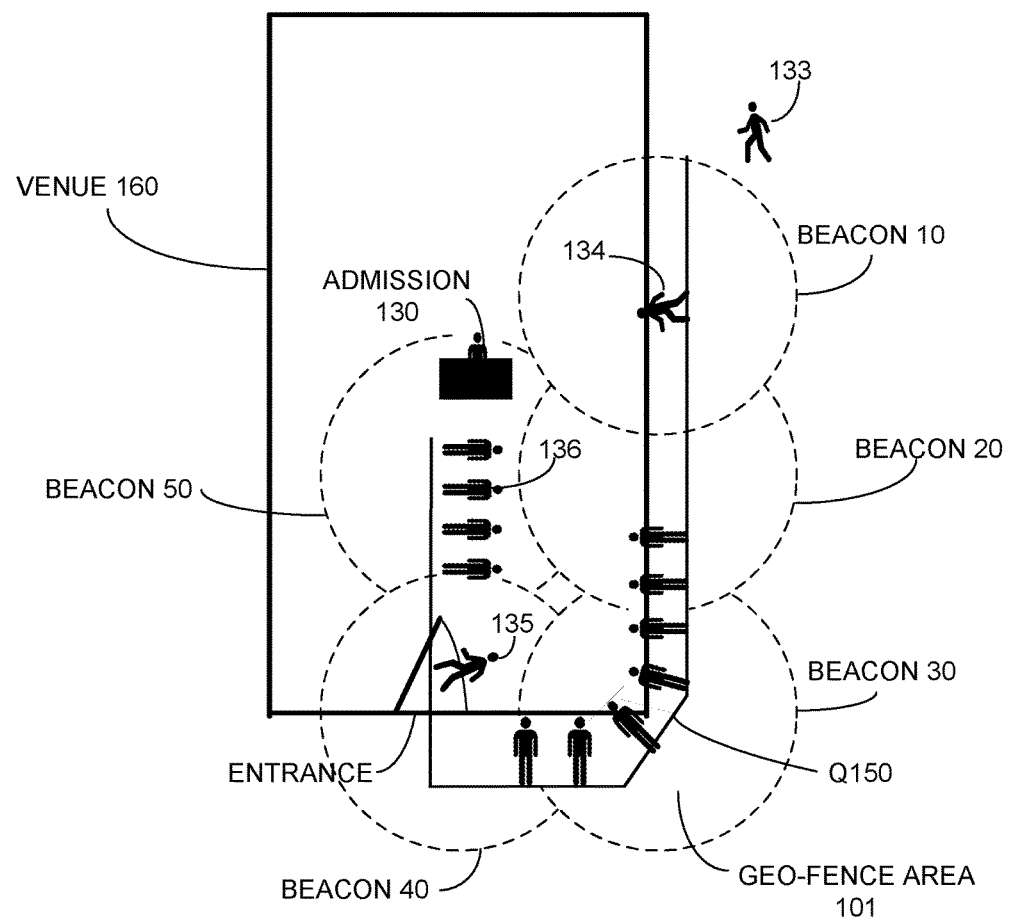
Figure 1C:
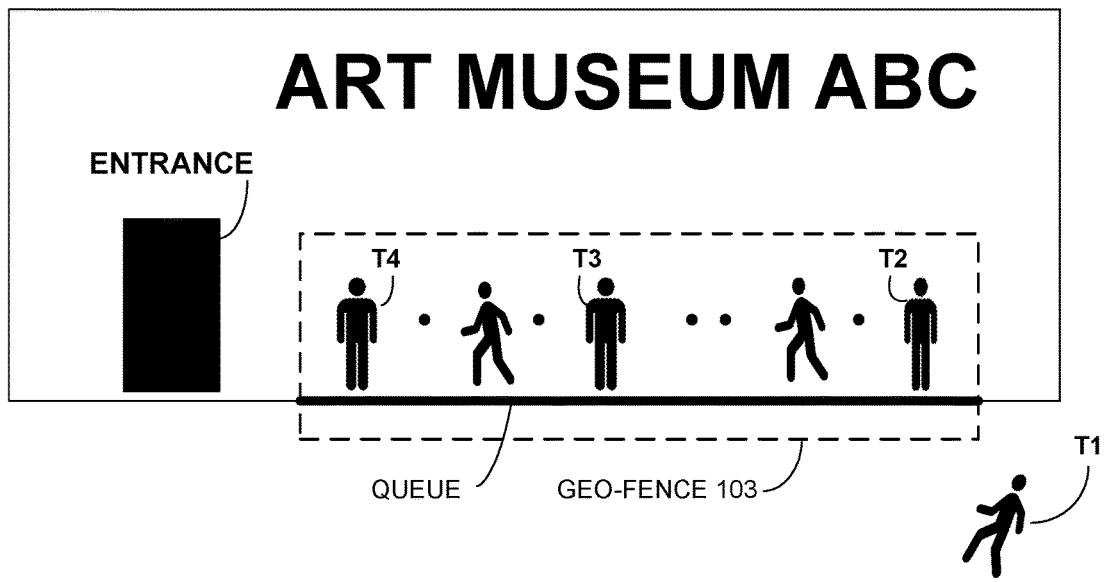
Figure 1D:
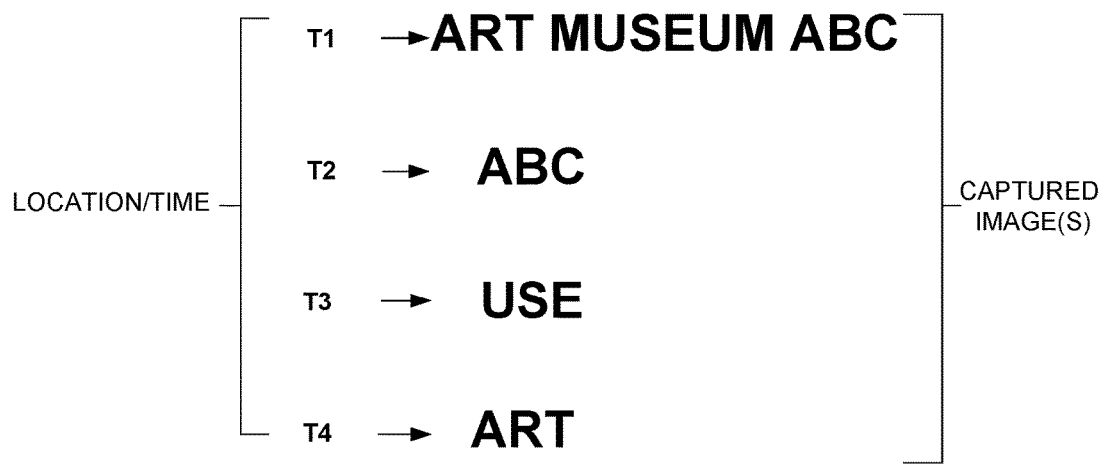
Figure 2:
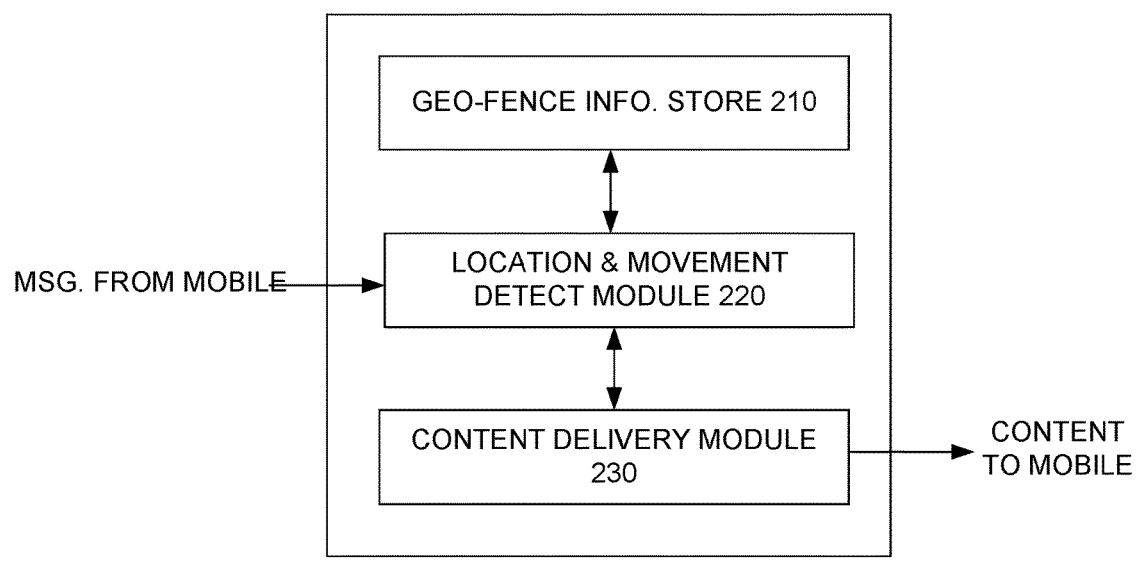
Figure 3A:
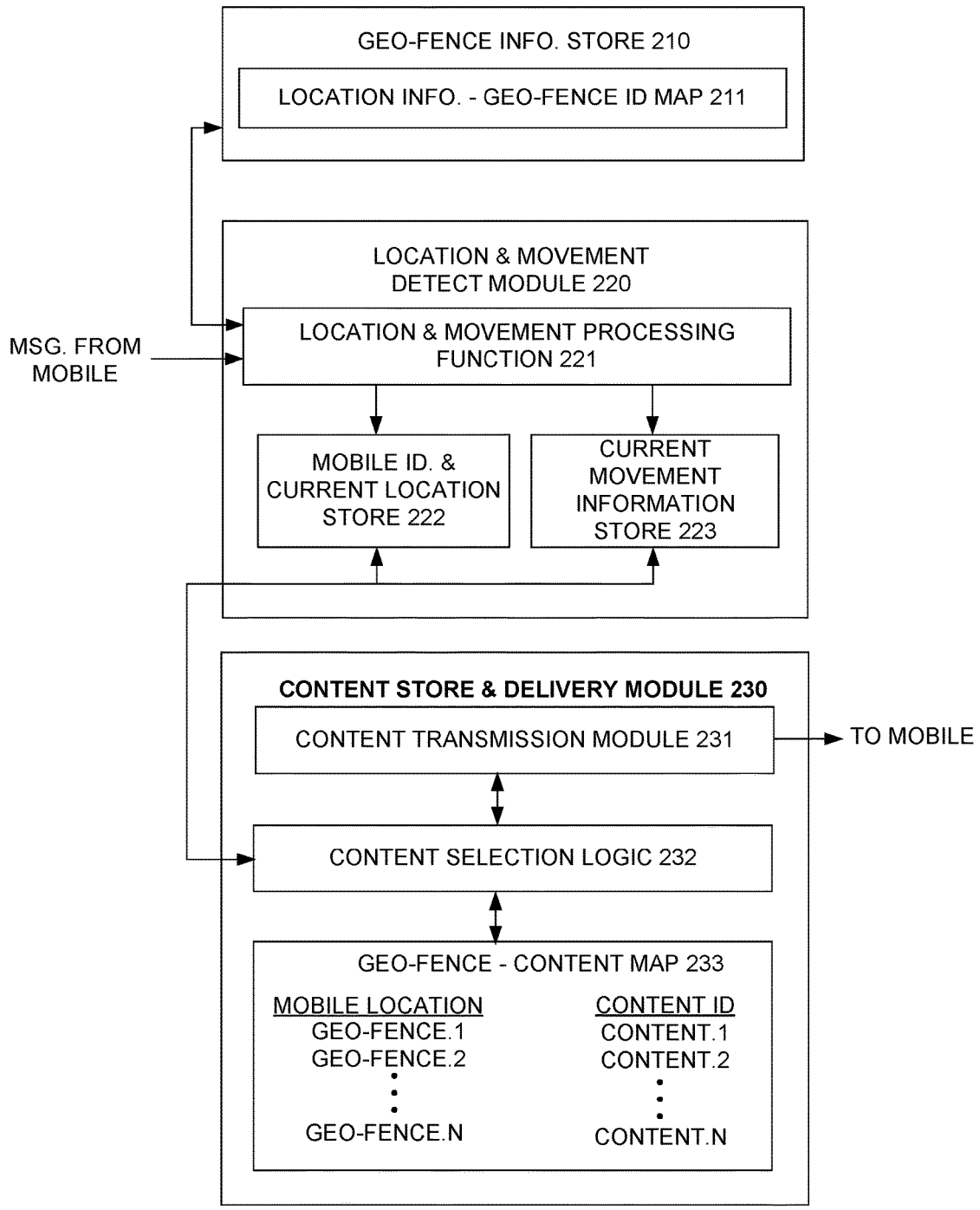
Figure 4:
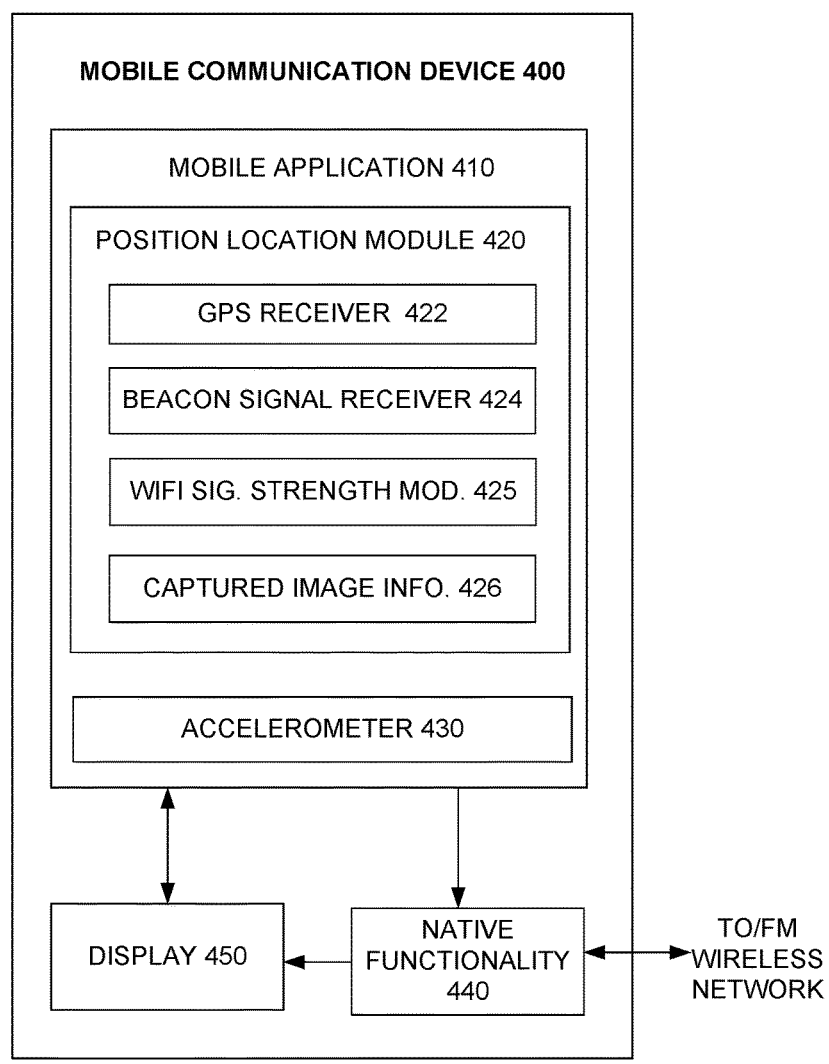

FIG. 1A is a diagram showing a GPS based geo-fence.
FIG. 1B is a diagram showing a beacon based geo-fence.
FIG. 1C is a diagram showing an ART MUSEUM ABC venue and individual approaching and waiting in a queue.
FIG. 1D is a diagram showing a relationship between locations and times and image capture information.
FIG. 2 is a diagram showing functional blocks comprising a media content server 200.
FIG. 3A is a diagram showing the functional blocks of the media content server 200 in more detail.
FIG. 3B is a diagram showing a structure 223 for storing movement information.
FIG. 3C is a diagram showing a location information to geo-fence map 211.
FIG. 4 is a diagram showing functional blocks comprising a mobile communication device 400.

Figure 5:
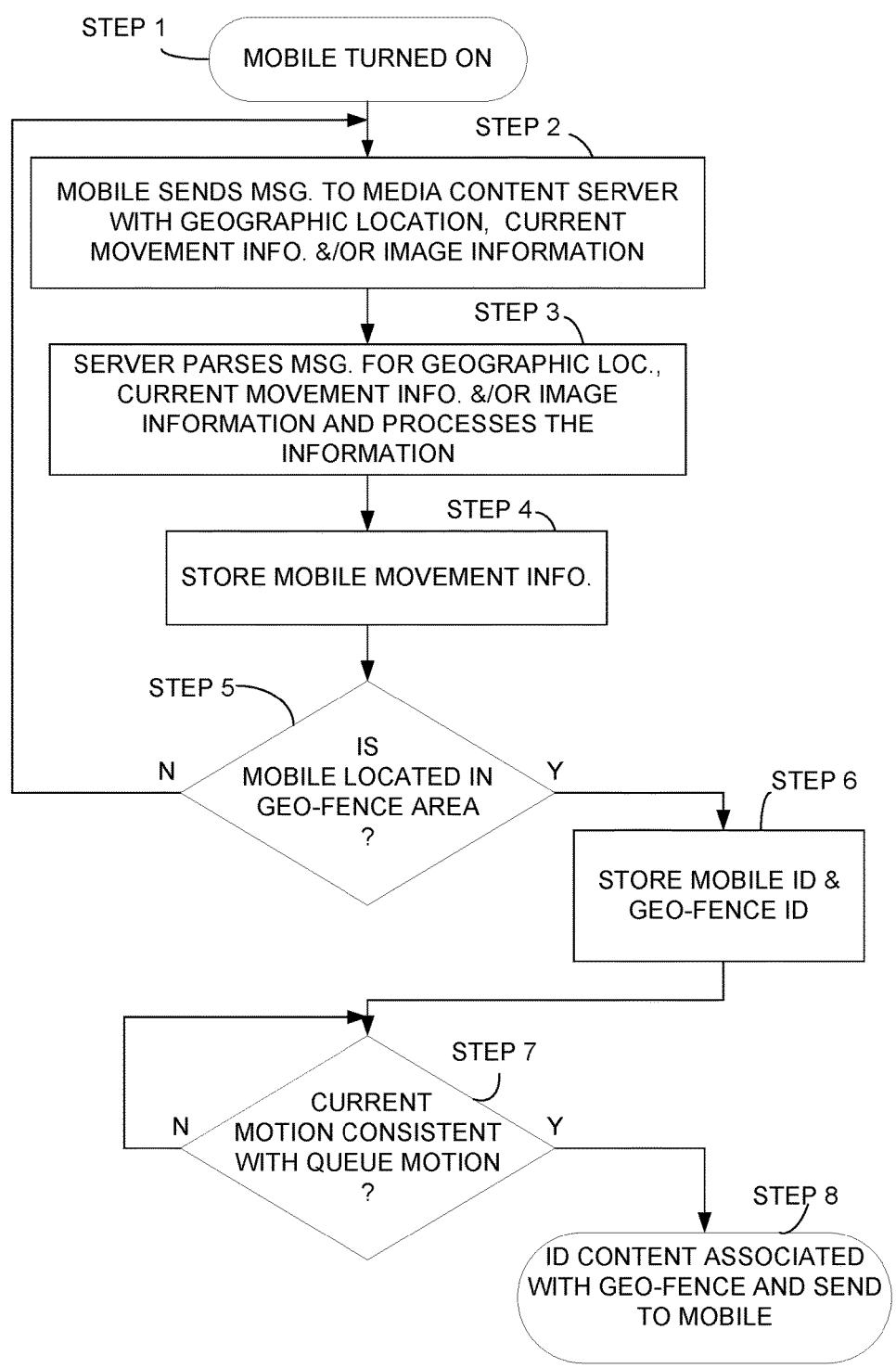

FIG. 5 is a logical flow diagram of a process employed by a media content delivery system to identity media content for delivery to a mobile device.

4. DETAILED DESCRIPTION

While delivering information to a mobile computer application (mobile application) running on a mobile communication device (mobile device) based upon the current geographic location of the device is a convenient means for the device user to receive and consume the information, it may or may not be desirable to deliver content depending upon the current activity that a device user is engaged in. Activity in this context can be defined by a current or recent pattern of movement exhibited by a mobile device during the time they are proximate to a particular geographic location. For example, particular types of activities exhibit certain movement patterns. For example, a mobile device attached to a jogger can exhibit a constant, fairly rapid movement, while a mobile device attached to an individual who is sitting in a cinema watching a movie or eating a meal in a restaurant can exhibit no movement for the period of time they are watching the movie or during the time they are eating. Another type if motion is exhibited by individuals waiting in a line to enter a restaurant, to enter a cinema, museum or art gallery, or any other venue that requires individuals to take a position at the end of a line or queue. The pattern of movement exhibited by an individual waiting in a line can be characterized by intermittent periods of motion and periods of no motion each period being of variable duration. Typically, an individual waiting in a line to enter a venue (restaurant, museum, cinema, etc.) can use their mobile device to retrieve information from a server associated with the venue by going to the venue's web site and downloading the information. Alternatively, if the venue's server knows that the individual is proximate to the venue, then the server can be controlled to push content to the individual for selection without it being requested. However, mere proximity to a venue is no indication that an individual is interested to view content associated with the venue, or that they intend to enter the venue, and so targeting anyone proximate to the venue's location is no guarantee that the content will be viewed.

Accordingly, I have designed a media content delivery system that only delivers content relating to a particular geographic location if it detects that an individual is proximate to that location, and it determines that the individual exhibits motion that is consistent with waiting in a line or queue that is associated with this location or venue. In this regard, and according to one embodiment, a mobile computer application running on a mobile device can operate to detect a current location of the device and to send this location information to a network server. Functionality on the server can operate to determine whether the mobile device is located within a geo-fence area, and if so, it can determine whether the mobile device movement is characteristic of someone who is waiting in line. If it is determined that the mobile device user is waiting in line and within the geo-fence area, then the server can select and deliver content to the mobile device that relates to the current location of the mobile device. According to another embodiment, a mobile device can operate to capture local environmental image information, and send this information to the network server. Functionality on the network server can process the image information to determine whether the mobile device user is proximate to a particular venue, and if so, it can use the captured image information to determine a pattern of mobile device movement and whether this pattern of movement is characteristic of someone who is waiting in a line or queue associated with the venue. The content delivered to the mobile device can be designed to motivate the mobile device user to engage in a particular activity or to take a particular action, such as to become a member of the venue, or to engage in social media relating to the venue, or to access particular information relating to the venue. The content delivery system described above is comprised of a mobile device, a geo-fence, and a media content server. A number of different location technologies can be employed to create the geo-fence mentioned above. In this regard, FIG. 1 illustrates a geo-fence created using geographic positioning system (GPS) technology.

FIG. 1A shows seven different GPS locations, GPS LOC.1 to GPS LOC.7, all of which together comprises a geo-fence area 101 with a perimeter 100. The area in the geo-fence comprises a customer waiting line or queue, Q150 associated with a venue 160, which can be a museum, a restaurant, a cinema or any other venue for which admission requires individuals to wait in the queue. A mobile device user that is detected to be proximate to any one of these GPS locations can be identified as waiting in the Q150 if they exhibit motion that is characteristic of someone waiting in a queue (i.e., they have recently stopped moving and are currently motionless, or they are currently moving slowing subsequent to having come to a stop, or after initially coming to a stop proximate to a GPS location, they exhibit alternate periods of slow movement or no movement). In this regard, an individual 136 is represented to be motionless while standing in the Q150. This individual is shown inside the venue and the fourth person from an admission desk 130. In order for this individual to have progressed to this position in the Q150, it can be assumed that a history of their recent motion would indicate an initial period of no motion, followed by interleaved periods of slow or no motion. The duration of each period can be selected arbitrarily, or it can be determined empirically through observation, but regardless of the manner in which a period duration is assigned, it is necessary for an individual to be proximate to any one of the GPS locations and to have recently come to a stop for some minimum period of time. Any subsequent periods of movement that are detected can be intermittently slow (walking pace . . . see individual 135) and no movement, and each period can be of almost any duration, depending upon how rapidly or slowly the Q150 is moving.

Continuing to refer to FIG. 1A, although an individual 134 is shown to be walking within the geo-fence area 101, and they are approaching the back end of the Q150, for the purpose of this description, it is assumed that this individual has not yet come to an initial stop, and so it is determined that they are not yet waiting in line and so are not eligible to receive content associated with the venue 160. Typically, GPS technology can be employed to construct a geo-fence that is located in open space, or exterior to an enclosed structure that would otherwise hinder the reception of a GPS signal. In this regard, the position of an individual located in an interior space (not served by GPS) can be determined using Indoor Positioning System technology, such a WiFi technology (signal strength) or Beacon technology. So, in the event that a queue extends from an exterior space to an interior space (or vice versa) it can be necessary to employ multiple types of positioning system technologies to determine a current location of an individual.

FIG. 1B illustrates many of the elements shown in FIG. 1A, with the exception that the geo-fence in FIG. 1B is constructed using beacon technology. In the context of this description, beacons are wireless devices that transmit a low powered signal into their environment that has information that uniquely identifies each beacon. Each beacon can be configured to have a unique identifier, and it can be placed in a known position in space and used, in this case, as an element of a geo-fence 102. Typically but not exclusively, beacon technology is suited for use in interior space, or space having a roof that is comprised of material that a GPS signal is not able to penetrate. FIG. 1B includes five beacons, Beacon 10, Beacon 20, Beacon 30, Beacon 40 and Beacon 50. The dashed circle identified by each beacon represents a distance at which a beacon signal of a particular (or any) signal strength can be received. Taken as a whole, the areas encompassed by all of the dashed circles define a geo-fence periphery 102. While the description only discusses the use of GPS and beacon technologies to create a geo-fence, other technologies can also be utilized for this purpose.

In certain instances, a GPS signal may not be available, or beacons may not be employed to define a geo-fence area. In this case, a mobile image capture device, such as a mobile phone, tablet, or other device can be configured with image capture hardware and software that permit the device to capture and record image information from its environment. Environmental image information can be periodically captured and used to determine a current geographic location of a mobile device that captures the information. Systems that use image information to determine a current location are known and commercially available, and these systems can employ different methodologies to process the image information to determine a distance between the image capture device and a location that is recognizable by the system. As will be describe later, the captured and recorded image information (either still image information or video information) can be transmitted to a server with functionality that operates to identify a current location of a mobile image capture device and that operates to determine a type of activity a mobile image capture device user is currently engaged in, such as whether motion (as determined by a sequence of captured images) is consistent with that exhibited by an individual standing in a queue. This image information can be used in conjunction with GPS or beacon information and movement information detected by the mobile device, or the image information can be exclusively used to determine both a current location of a mobile device and an current activity in which a mobile device user is engaged in. In this regard, FIG. 1C illustrates a venue, Art Museum ABC, having an entrance, a queue (defined by the bold, solid line) that is within a geo-fence area 103, and an individual is shown to be approaching the geo-fence at a time T1, and then subsequently moving into the geo-fence and through the queue at times T2-T4. A mobile image capture device carried or worn by the individual can capture and record image information at each of the four times (T1-T4). FIG. 1D shows image information that can be captured by the mobile device at each time T1-T4, and as the image capture device moves closer to the museum, the lettering in name of the museum (ART MUSEUM ABC) will become larger (not shown in FIG. 1D) in the image. This change in captured image size can, for instance, be used to determine that an individual is approaching a known/recognizable venue. Also, if the image capture device is able to capture 3-D image information, this information can be used to determine distance to the venue.

As described earlier, a network server has functionality that allows it to determine whether a mobile device is located within a geo-fence area, and if so, it can determine whether the mobile device movement is characteristic of someone who is waiting in a queue. If the server determines that the mobile device is within a geo-fence area and the user is waiting in a queue, then it operates to select media content to deliver to the mobile device user that is specific to a venue associated with the queue the mobile device user is standing in. Media content that is delivered to a user who is standing in a queue is designed to incent them to become engaged in a transaction of some sort. The media content can comprise a tangible or intangible offer or reward as an incentive. The offer can be an invitation to jump ahead in the queue in exchange for becoming a member of the venue, or in exchange for engaging in some social networking to promote the venue for instance. FIG. 2 is a high level diagram illustrating the functional elements comprising a server 200 to operate to support the delivery of location and movement sensitive content.

The media content server 200 in FIG. 2 has a store 210 of geo-fence information, a location and movement detection module 220, and a content delivery module 230. In general operation, the server 200 can receive a message from a mobile device (cell or smart phone, tablet or some other type of mobile computational device, or any type of mobile communication device) that includes information that allows the server to determine the current geographic location of the device and allows the server to determine the current type of movement associated with the mobile device. In this regard, a message from a mobile device can include information that can be used to calculate longitude and latitude, it can include the identity of one or more beacons (and signal strength) that the mobile device is within range of, or it can include information corresponding to an image captured by the mobile device. The server 200 can use the GPS, beacon or image information, and information in the geo-fence information store 210, to determine in which particular geo-fence area the mobile device is currently located. Subsequent to determining that a mobile device is located within the area of a particular geo-fence, the server 200 can use movement information in a mobile device message to determine whether the device user is standing in a queue associated with the geo-fence or not. If it is determined that they are standing in a queue, then the server can select media content stored in the module 230 that corresponds to the venue associated with the queue the device user is standing in, and send this content to the mobile device. The media content server 200 will now be described in more detail with reference to FIG. 3A below.

FIG. 3A illustrates functional elements comprising the server 200 that operate to determine a current location of a mobile device, that operate to determine a current type of movement associated with mobile device, and that operates to select and deliver media content to the mobile device that is germane to a venue associated with a queue a mobile device user is standing in. Specifically, the server 200 is, among other things, comprised of the geo-fence information store 210 which has a map structure 211 that correlates geographic location information (latitude and longitude), beacon ID information (and possibly WiFi signal strength information or other IPS information) and environmental image information to the identities (or to an identify) of a geo-fence instance. The server location and movement detection module 220 has a location and movement processing function 221, a mobile ID and current location store 222, and a store of current and recent mobile device movement information 223.

The location and movement processing function 221 comprising module 220 operates to parse messages from mobile devices in order to detect current mobile device location and movement information. The location information can be GPS location information such as longitude and latitude information that identifies a current geographic location of the mobile device, the location information can be the identity of one or more fixed location beacons, the location information can be the identify of one or more fixed location Wi-Fi access points, or the location information can be environmental image information. The location information parsed from messages received from a mobile device can be maintained in the current location store 222. Information maintained in the current location store 222 can be used by the module 220 as a pointer or a reference into the map structure 211 to determine the identity of a geo-fence that corresponds to the current geographic position of the mobile device. The structure of this map 211 is illustrated with reference to FIG. 3C which shows the identities of several beacons, it shows GPS locations and it shows image information at particular locations all of which relate to particular geo-fences 102, 100 and 103 respectively. According to an embodiment in which capture image information is used, the image information maintained in the store 222 (i.e., the captured image information in FIG. 1D) can be compared to the image information maintained in the map structure 211 to identify a current location of a mobile device and user. The movement information received in messages from a mobile device can be detected by an accelerometer operating on a mobile device, or this movement information can comprise a series of images captured by the mobile device at known points in time and processed by the module 220. This movement information corresponds to a current rate of movement of the device at the time a message is sent by the device, and the rate of movement can be determined based on accelerometer information or based upon a series of images captured at known points in time. A recent history of the movement information received in a plurality of messages from a particular mobile device can be stored and used to detect a pattern of movement of the mobile device. The movement information stored in the module 223 can be time stamped so that it is known when in time the mobile device is moving, is stopped and for how long it is moving or stopped.

Continuing to refer to FIG. 3A, the content store and delivery module 230 has a content transmission module 231, it has content selection logic 232 and it has a map 233 that associates or maps each instance of a geo-fence area with particular media content. The logic 232 periodically checks on information maintained in the stores 222 and 223 to determine the identify of one or more mobile devices that are currently located within a particular instance of a geo-fence area, and if it determines that a mobile device is currently located within a geo-fence area, then it examines the current and/or recent movement information maintained in the store 223 to determine whether the mobile device user exhibits movement that is consistent with waiting in a queue or not. A structure in which movement information can be maintained is shown with reference to FIG. 3B. If the current and/or recent movement information is characteristic of a person waiting in a queue, then the logic uses the location of the geo-fence as a pointer into the map 233 to find the identity of content that is associated with the geo-fence location and passes this content to the transmission module 231 which operates to deliver the content to the mobile device. While the motion information maintained in the structure in FIG. 3B is based upon accelerometer information, this structure can also maintain motion information that is based upon image information received from a mobile device that is captured at known times. The functional elements comprising a mobile communication device are illustrated below with reference to FIG. 4.

FIG. 4 is a diagram showing functionality comprising a mobile communication device 400 that is configured with a mobile application 410 that operates to detect a current geographic position and to detect a current motion of the device. The mobile device also has native functionality 440 that operates to support connectivity with a wireless network, user interaction (verbal and physical interaction) with the device 400, and which operates to support the reception of media content from the media content server 200 and to display of media content on a display 450. The native functionality 440 can also comprise image capture means such as a still image or video image capture element and any necessary firmware or other logical instructions needed to control the image capture means. In an alternative embodiment (not shown), the mobile application 410 can be configured to store geo-fence information (such as the store 210 described with reference to FIG. 3A), and it can be configured to process location and store location information and to process and store current movement information in a manner similar to that described with reference to the location and movement detection module 220 in FIG. 3A.

In operation, while the mobile device 400 is powered, a position location module 420 comprising the mobile application 410 operates to periodically receive one or more of a GPS signal, a beacon signal or a WiFi signal information, and which operates to maintain a plurality of instances of image information captured by the image capture means (or a series of frames associated with captured video over at or during some know time) prior to this information being transmitted to the content server 200. Specifically, a GPS receiver 422 operates to receive GPS signals from up to four GPS satellites, and uses information in the four GPS signals to calculate a current geographic location, and either send this geographic information to the server 200, or alternatively send it to a location and movement detection module running on the mobile device 200, which can use the geographic information to identify a particular geo-fence corresponding to the current mobile device location. In the event that the mobile device 400 is currently located in the interior of a structure that shields it from GPS signals, then a beacon signal receiver 424 (or WiFi signal strength module 425) can operate to receive beacon signals that include the unique identity of a fixed beacon in a known location, and send the beacon/WiFi AP identity and signal strength to the location and movement detection module 220 running on the server 200, or alternatively to similar functionality running on the mobile device, which can use the identity of the beacon and signal strength to identify a particular geo-fence corresponding to the current mobile device location.

Regardless of in which device (mobile or server) the location and movement information is located and the information processed, if the mobile device 400 is currently located within a geo-fence area, and if the device is determined to exhibit motion that is characteristic of a person waiting in a queue, then the server 200 operates to deliver media content to the mobile device that corresponds to a venue that is associated with the queue the mobile device user is waiting in. The initial content that is delivered can be a list of media content options from which a device user can select to receive and interact with, or it can be content that the device user can interact with directly. As described earlier, the media content is designed to incent the mobile device user to enter into a transaction that in some manner relates or is beneficial to the venue. This incentive can take the form of some type of reward that the user realizes prior or subsequent to entering into the transaction. The operation of the media content delivery system 50 to deliver media content that relates to a particular venue is described below with reference to FIG. 5.

FIG. 5 illustrates the procedural and logical steps executed to deliver media content to a mobile device under the control of a user who is located in a queue in order to gain entrance to a venue. The delivered media content relates in some manner to the venue and the mobile device user can select, view and interact with the media content depending upon the type of media content that is delivered. It should be understood, the content delivery system described herein can operate effectively if some of the functional elements comprising the media content delivery system are implemented in the mobile communication device 400, and some of the same functional elements are implemented in the media content server 200. For the purposes of FIG. 5 however, and with respect to the geographic position system functionality and the motion detection functionality, it is assumed that the mobile communications device operates to only receive a GPS, or other positioning system signals or to capture image information, and to detect current mobile communication device motion, and to send GPS signal information and/or captured image information and detected motion information to the media content server 200 for processing. The server 200, according to this embodiment, is configured to examine the GPS signal information and/or the captured image information to determine a current geographic location of the mobile device, and it is configured to examine the motion information (detected by an accelerometer or image information) to determine a current rate of motion of the mobile device. In other embodiments, the mobile device can perform either or both of the GPS signal processing and the motion information processing. In another embodiment, the processed GPS signal information and motion information can be stored on the mobile device 400 where it can be accessed, as needed, by the media content server 200. In still another embodiment, the geo-fence information store 210 can be implemented in the mobile device. In this regard, the media content delivery system 50 configuration is flexible and can depending upon the type and capabilities of the mobile device 400, the media content server 200 and the network over which each communicates with the other.

Turning now to a description of FIG. 5, in Step 1 the mobile communications device 400 is turned on and in Step 2 starts receiving geographic positioning signals from either an outdoor positioning or an indoor positioning system and/or it operates to capture environmental image information. The mobile device also starts detecting its current motion or rate of movement using an accelerometer or other motion detection device. The received positioning information and/or captured image information and detected current movement information are then incorporated into a message that is transmitted over a wireless network to the media content server 200. In Step 3, the server 200 receives the message from the mobile device 400, parses it looking for the raw positioning (GPS and/or image information) and movement information, and the processing function 221 operates on the parsed positioning and movement information to convert it into geographic coordinates (or stores the image information in a particular format and examines the image information to determine whether the mobile device is in motion or not over some specified period of time) and rate of motion information. In Step 4, the rate of motion information is maintained in the store 223 for some specified period of time, and in Step 5 the processing function 221 operates on the positioning information to determine if the mobile device 400 is currently located within a geo-fence area, such as the area 101 in FIG. 1A. In one embodiment, the position information corresponds to image information, and in this case the processing function 221 compares the captured image information to a store of images that are at known locations. Specifically, the function 221 uses the positioning information as a pointer into the map 211 stored in association with the server 200, and if the geographic coordinates generated in Step 3 match any coordinate location stored in the map 211 (or if the captured image information matches image information stored in the map 211), then the function 221 determines that the mobile device 400 is currently located in the geo-fence area, and in Step 6 places the identity of the geo-fence in the store 222 where it is maintained for some specified period of time. In Step 7, the content selection logic 232 described with reference to FIG. 3A examines the movement information store in Step 4 to determine whether the recent history of mobile device movement is consistent with movement exhibited while waiting in a queue, and if it is, then the logic uses the geo-fence identity identified stored in Step 6 as a pointer into the content map 233 to identify content for delivery to the mobile device 400.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. In a media content delivery system, a method of delivering media content to a mobile communication device, comprising:
   receiving by a media content server over a network from a mobile communication device information used by the server to identify a geographic position of the mobile communication device;
   comparing the identified geographic position to the geographic positions of each of a plurality of geo-fence instances to identify a single one of the plurality of the geo-fence instances;
   determining that a series of environmental images captured by the mobile communication device and sent to the server is consistent with a movement pattern that is characteristic of a mobile communication device user waiting in a queue; and
   selecting and transmitting media content over the network to the mobile communication device that relates to the geo-fence instance.

2. The method of claim 1, wherein the information received by the media content server that is used to identify the geographic position of the mobile communication device is geographic position information that the mobile communication device receives from an outdoor or an indoor geographic positioning system or is environmental image information captured by the mobile communication device.

3. The method of claim 1, wherein the information used by the server to identify a recent movement history of the mobile communication device comprises a plurality of serial instances of an instantaneous rate of motion detected by a movement detection device over a selected period of time or is a series of environmental images captured by the mobile communication device over the selected period of time.

4. The method of claim 2, wherein the environmental image information captured by the mobile communication device over the selected period of time is information comprising a still image or a video image.

5. The method of claim 1, wherein the geo-fence instance and the queue are both associated with a same venue.

6. The method of claim 1, wherein the geo-fence area is comprised of a plurality of sets of geographic location coordinates or a set comprising a plurality of environmental images.

7. The method of claim 6, wherein each one of the plurality of the geographic coordinate sets is comprised of latitude and longitude information and each one of the environmental images is comprised of a plurality of pixels, each pixel having grey scale or color information.

8. The method of claim 1, wherein the selected media content is designed to motivate a mobile device user to become engaged in a particular activity or to take a particular action that relates to the venue.

9. The method of claim 1, wherein the movement pattern characteristic of a mobile device user waiting in the queue is an alternating pattern of motion and no motion.

10. A network server for delivering media content based upon a geographic location and a recent movement history of a mobile communication device, comprising:
    a plurality of stored geo-fence area instances, each geo-fence area instance is associated with geographic location information or environmental image information;
    a store having a recent mobile communication device movement history and having information relating to a current geographic location of the mobile communication device;
    one or more instances of content stored in association with each of the geo-fence area instances; and
    a processor running logical computer instructions that operates on the information relating to the stored current geographic location and the recent movement history of the mobile communication device to determine that the mobile communication device is currently located within a particular one of the plurality of the geo-fence area instances, and that the recent history of the mobile communication device movement is consistent with a movement pattern that is characteristic of a mobile device user waiting in a queue, and selecting and transmitting media content to the mobile communication device that relates to the particular one of the plurality of the geo-fence area instances;
    wherein a series of environmental images captured by the mobile communication device and sent to the network server is used to determine that the recent history of the mobile communication device movement is consistent with a movement pattern that is characteristic of a mobile communication device user waiting in a queue.

11. The network server of claim 10, wherein each of the geo-fence area instances is comprised of either a plurality of sets of geographic location coordinates, or is comprised of a set of images relating the each geo-fence instance or both.

12. The method of claim 11, wherein each one of the plurality geographic coordinate sets is comprised of latitude and longitude information, and each image set is comprised of a plurality of environmental images each having image information that is recognized by the network server to be associated with any one of the geo-fence instances.

13. The method of claim 10, wherein the recent movement history is comprised of a plurality of instantaneous rate of motion instances detected over a pre-selected period of time or is comprised of a series of environmental images captured over a pre-selected period of time.

14. The network server of claim 10, wherein the characteristic movement pattern of a mobile device user waiting in the queue is an alternating pattern of motion and no motion.

15. A media content delivery system, comprising:
a mobile communication device connected over a wireless network to a media content server, wherein the mobile communication device operates to send information to the media content server which is used by the server to determine that a current geographic position and recent movement history of the mobile communication device is coincident with a geo-fence area instance location, and using a recent history of the movement information to determine that the recent mobile communication device movement is consistent with a pattern of movement that is characteristic of a mobile device user waiting in a queue, and the media content server selecting and transmitting media content to the mobile communication device that relates to the geo-fence instance;
wherein a series of environmental images captured by the mobile communication device and sent to the network server is used to determine that the recent history of the mobile communication device movement is consistent with a movement pattern that is characteristic of a mobile communication device user waiting in a queue.

16. The media content delivery system of claim 15, wherein the recent movement history is comprised of a plurality of instantaneous rate of motion instances or a series of environmental images detected over a pre-selected period of time.

17. The media content delivery system of claim 15, wherein the characteristic movement pattern of a mobile device user waiting in the queue is an interleaved pattern of motion and no motion.

18. The media content delivery system of claim 15, wherein both the queue and the geo-fence area instance are related to a particular venue.

19. The media content delivery system of claim 15, wherein the selected media content is designed to motivate a mobile device user to become engaged in a particular activity or to take a particular action that relates to the venue.

* * * * *